United States Patent
Shim

(10) Patent No.: US 7,627,332 B2
(45) Date of Patent: Dec. 1, 2009

(54) PERIODIC POSITIONING METHOD IN MOBILE COMMUNICATIONS SYSTEM

(75) Inventor: Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 464 days.

(21) Appl. No.: 11/501,885

(22) Filed: Aug. 10, 2006

(65) Prior Publication Data

US 2007/0037585 A1 Feb. 15, 2007

Related U.S. Application Data

(60) Provisional application No. 60/707,167, filed on Aug. 11, 2005, provisional application No. 60/707,168, filed on Aug. 11, 2005, provisional application No. 60/716,499, filed on Sep. 14, 2005, provisional application No. 60/716,517, filed on Sep. 14, 2005, provisional application No. 60/724,795, filed on Oct. 11, 2005, provisional application No. 60/741,054, filed on Dec. 1, 2005, provisional application No. 60/762,122, filed on Jan. 26, 2006.

(30) Foreign Application Priority Data

Mar. 30, 2006 (KR) ........................ 10-2006-0029136

(51) Int. Cl.
*H04W 24/00* (2009.01)
(52) U.S. Cl. .............. 455/456.1; 455/456.3; 455/456.6; 455/414.3
(58) Field of Classification Search ............. 455/404.2, 455/456.1–457, 414.1; 340/539.13
See application file for complete search history.

(56) References Cited

U.S. PATENT DOCUMENTS

| | | | |
|---|---|---|---|
| 7,218,940 B2 * | 5/2007 | Niemenmaa et al. ...... | 455/456.1 |
| 7,254,388 B2 * | 8/2007 | Nam et al. .................. | 455/418 |
| 7,424,293 B2 * | 9/2008 | Zhu ......................... | 455/432.1 |
| 2004/0203885 A1 | 10/2004 | Quaid | |
| 2004/0203918 A1 * | 10/2004 | Moriguchi et al. ........ | 455/456.1 |
| 2005/0099972 A1 | 5/2005 | Motegi et al. | |
| 2005/0118999 A1 | 6/2005 | Zhu | |
| 2005/0197140 A1 * | 9/2005 | Ruutu et al. .............. | 455/456.2 |
| 2005/0250516 A1 * | 11/2005 | Shim ........................ | 455/456.1 |
| 2006/0046747 A1 * | 3/2006 | Abraham et al. ......... | 455/456.6 |
| 2006/0194594 A1 * | 8/2006 | Ruutu et al. .............. | 455/456.5 |
| 2006/0258371 A1 * | 11/2006 | Krishnamurthi et al. . | 455/456.1 |
| 2006/0276167 A1 * | 12/2006 | Burroughs ................. | 455/404.2 |
| 2006/0293066 A1 * | 12/2006 | Edge et al. ................ | 455/456.3 |
| 2007/0032249 A1 * | 2/2007 | Krishnamurthi et al. . | 455/456.1 |
| 2007/0037586 A1 * | 2/2007 | Kim et al. ................. | 455/456.1 |

\* cited by examiner

*Primary Examiner*—Sharad Rampuria
(74) *Attorney, Agent, or Firm*—Birch, Stewart, Kolasch & Birch, LLP

(57) ABSTRACT

A positioning method in a SUPL based position information system, and more particularly, a method for performing periodic positioning capable of processing a periodic positioning request by a location server or a periodic positioning request by a mobile communications terminal when the location server and the terminal respectively manage a trigger generating the periodic positioning.

7 Claims, 9 Drawing Sheets

PERIODIC POSITIONING METHOD IN MOBILE COMMUNICATIONS SYSTEM

RELATED APPLICATION

The present disclosure relates to a subject matter contained in priority U.S. Provisional Application No. 60/707,167 filed on Aug. 11, 2005, U.S. Provisional Application No. 60/707,168 filed on Aug. 11, 2005, U.S. Provisional Application No. 60/716,499 filed on Sep. 14, 2005, U.S. Provisional Application No. 60/716,517 filed on Sep. 14, 2005, U.S. Provisional Application No. 60/724,795 filed on Oct. 11, 2005, U.S. Provisional Application No. 60/741,054 filed on Dec. 1, 2005, U.S. Provisional Application No. 60/762,122 filed on Jan. 26, 2006, and Korean Application No. 10-2006-0029136, filed on Mar. 30, 2006, all are herein expressly incorporated by reference in its entirety.

BACKGROUND OF THE INVENTION

1. Field of the Invention

The present invention relates to a mobile communications system, and particularly, to a periodic positioning method in a Secure User Plane Location (SUPL) based position information system.

2. Background of the Invention

In general, a mobile communications system has a function unit related to calculating of position of a mobile communications terminal (referred to as just a 'terminal' hereafter) in a mobile communications network, and thus provides location services for transferring the location (position) of the terminal to a certain entity periodically or according to a user's request.

Networks related to the location services have different structures according to an inner network structure of 3GPP or 3GPP2. The position of the terminal can be calculated using a cell-ID method for transferring a cell ID to which the terminal belongs, a method in which a time taken by transferring a radio wave from a terminal to each base station is calculated and a location (position) of the terminal is then calculated using a triangulation, a method using a Global Positioning System (GPS), and the like.

However, in order to provide location services to a user using the position calculation (positioning) method, considerable signaling and position information should be sent and received between the terminal and a location server. The so-called positioning technologies that have been standardized for providing such location services, namely, a location service based upon the location (position) of a terminal, are undergoing rapid widespread dissemination. The technologies can typically be provided through a user plane and a control plane. A Secure User Plane Location (SUPL), which is well-known as an example of the positioning technologies, provides the location services through the user plane The SUPL is an efficient method for transferring location (position) information required for the positioning of a terminal. The SUPL protocol transfers positioning assistance information such as Global Positioning System (GPS) assistance. The SUPL employs a user plane data bearer to carry positioning technology associated protocols between the mobile terminal and a network.

In general, in a positioning system, a SUPL network related to a location service roughly includes a SUPL agent, SUPL Location Platform (SLP) and SUPL Enabled Terminal (SET). The SUPL agent denotes a logical service access point using position information which is actually measured. The SLP denotes a SUPL service access point within a network portion where network resources are accessed to obtain position information. The SET denotes a device for communicating with the SUPL network using a SUPL interface. The SET may denote, for instance, one of a User Equipment (UE) of UMTS, a Mobile Station (MS) of GSM, an IS-95 MS, a laptop computer having a SET function, Personal Digital Assistances (PDAs) or the like. The SET may also denote various terminals which access through a Wideband LAN (WLAN).

The SET supports various procedures defined by the SUPL by being connected to the network through the user plane bearer. Here, a network that a user has originally registered is referred to as a home network. When a user moves and thus is located at another area which is not in the home network area, the corresponding area is referred to as a visited network. The SLP within the home network is called as a Home-SLP (H-SLP), and the SLP within the visited network is called as a Visited-SLP (V-SLP). Here, upon initiating a SUPL procedure at the network, an SLP to which an external client is initially connected is referred to as a Requesting SLP (R-SLP). The R-SLP is a logical entity which may be either the same as the H-SLP or not. In addition, a SET which is a target for a current positioning (i.e., location tracking) is defined as a target SET.

The SLP, as a network element, may include a SUPL Positioning Center (SPC) which is an entity for calculating an actual position, and a SUPL Location Center (SLC) which manages functions of the SLP other than calculating location (position) information, for example, functions of roaming and resource management. Therefore, the SET may calculate the position information (i.e., perform positioning) through a communication with the SPC via the SLC (i.e., proxy mode), and may calculate the position information (i.e., perform positioning) by being directly connected to the SPC (i.e., non-proxy mode).

The SUPL based immediate positioning method has been disclosed in the elated art, however, a SUPL based periodic positioning methods has not been proposed therein.

SUMMARY OF THE INVENTION

Therefore, an object of the present invention is to provide a SUPL based periodic positioning method.

To achieve these and other advantages and in accordance with the purpose of the present invention, as embodied and broadly described herein, there is provided a periodic positioning method in a mobile communications system comprising: initiating a session between a location server and the target terminal when a client requests positioning for a target terminal; sending trigger information from the location server to the target terminal; receiving a positioning-start message, which is sent by the terminal per each positioning period according to the sent trigger information; and exchanging (sending and receiving) consecutive messages between the location server and the target terminal to calculate a position of the terminal, and sending the calculated position value of the terminal to the client.

According to another embodiment of the present invention, a periodic positioning method in a mobile communications system may comprise: receiving in a terminal a session initiating message from a location server, the session initiating message including trigger type information; starting a trigger session with the location server according to the session initiating message; receiving a trigger message including trigger parameters from the location server; sending a positioning initiating message to the location server according to the trigger parameters; performing the positioning between the location server and the terminal; and receiving a session-end message from the location server to terminate the trigger session.

Preferably, the trigger type information indicates a periodic service type.

Preferably, the trigger parameters include at least a period for the periodic positioning and starting time and ending time of the periodic positioning.

Preferably, the periodic positioning method in the mobile communications system may further comprise sending a positioning request message including trigger parameters related to positioning for the target terminal from an agent to the location server.

According to still another embodiment of the present invention, a periodic positioning method in a mobile communications system may comprise: receiving a session-start message from a terminal; sending a session response message from a location server to the terminal; receiving a positioning initiating message sent by the terminal based upon a periodic trigger condition; performing the positioning between the terminal and the location server; and receiving a report message including the positioning result from the location server.

According to yet another embodiment of the present invention, a periodic positioning method in a mobile communications system may comprise: receiving a session-start message from a terminal; sending a session response message from a location server to the terminal; receiving a positioning initiating message sent by the terminal based upon a periodic trigger condition; performing the positioning between the terminal and the location server; and sending the positioning result from the location server to the terminal.

Preferably, the trigger type information indicates a periodic service type.

Preferably, the trigger parameters include at least a period for the periodic positioning and starting time and ending time of the periodic positioning.

Preferably, the positioning initiating message is sent when the periodic trigger condition is satisfied.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

The present invention can be implemented in a SUPL network. However, the present invention may be employed to radio (wireless) communication systems which are operated based upon different specifications. Hereinafter, the preferred embodiments of the present invention will be explained.

The present invention proposes a periodic positioning method in a SUPL based position information (positioning) system. Especially, the present invention proposes a method for performing a periodic positioning by allowing each of server and terminal to manage a trigger generating the periodic positioning.

In general, location services provided in a SUPL based positioning system may classified into a service by a network (i.e., Network-initiated case) and a service by a SET (i.e., SET-initiated case). The location services may be classified into a proxy mode that the SET performs positioning by directly exchanging messages with a H-SLP of a home network, and a non-proxy mode that the SET performs positioning by exchanging messages with a SUPL Location Center (SLP) and a SUPL Positioning Center (SPC) within the H-SLP.

In the present invention, a periodic positioning is divided into a Network-trigged case or a SET-trigged case according to a subject which manages trigger information. The divided cases will be re-classified into a service by a network (i.e., Network-initiated case and a service by the SET (i.e., SET-initiated case) to thusly be explained.

Figure 1:
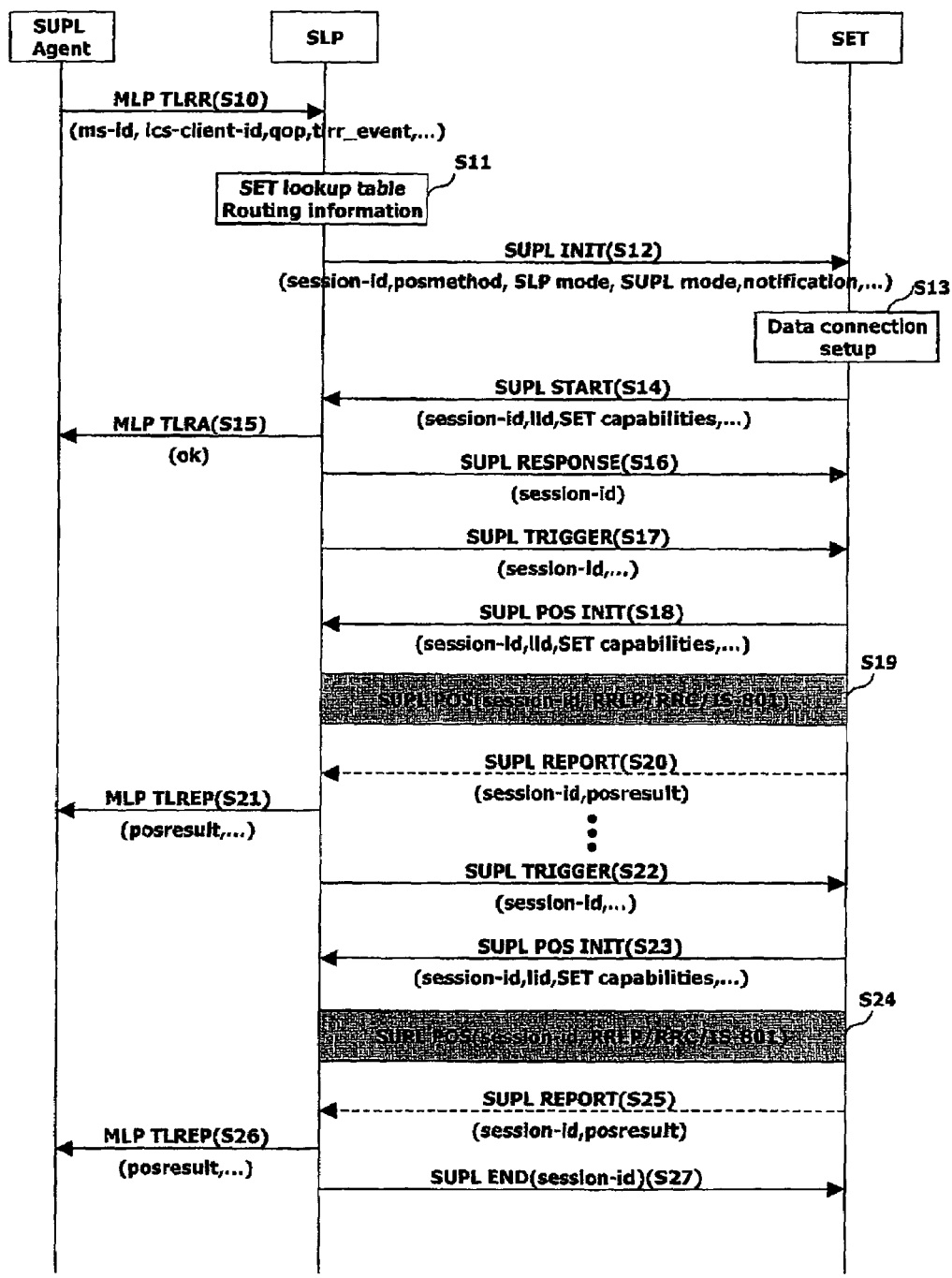
FIG. 1 is a view illustrating a periodic positioning procedure in accordance with a first embodiment of the present invention, which illustrates a positioning procedure in a Network-trigged case and a Network-initiated case.

FIG. 1 is a view illustrating a periodic positioning procedure in accordance with a first embodiment of the present invention. The first embodiment of the present invention illustrates a Network-trigged case and a Network-initiated case for a Non-Roaming Proxy mode. Here, the SLP corresponds to a network side, while a target SET (referred to as SET hereafter) corresponds to a terminal side.

When an outer LCS client requests a periodic positioning, a SUPL agent requests the positioning from the SLP using a Mobile Location Protocol (MLP) Trigged Location Reporting Request (TLRR) message (S10).

The MLP TLRR message may include parameters such as ms-id, client-id, QoP, and tlrr$_{13}$event which is a positioning related trigger parameter. Here, ms-id denotes a positioning target (SET), QoP denotes an accuracy (e.g., a time delay and a spatial accuracy) of a result for the positioning (location tracking) desired by the client, and tlrr$_{13}$event denotes a definition of the 'periodic', namely, a starting time and ending time of the periodic positioning (e.g., 8 am to 10 am) and a request period for the periodic positioning (e.g., a one-hour interval). The MLP TLRR message may further include parameters related to types of the positioning values (which, for example, represent a current value or a value obtained in the latest time when it is difficult to tracking the current value), and parameters for setting priorities with respect to each positioning request for several positioning requests.

The SLP having received the MLP TLRR message checks whether the SET can supports the SUPL by using a lookup table, and then checks whether the target SET is currently SUPL roaming using routing information (S11).

If it is checked that the SET supports the SUPL and is not roaming, the SLP sends a SUPL initiating message SUPL INIT to the SET to start a SUPL procedure with the SET (S12). The SUPL INIT message may include session-id, SLP mode, SUPL mode, positioning method (posmethod) to be used, and the like. Here, the SLP mode denotes an operation mode of the SLP (i.e., a Proxy mode or a Non-Proxy mode), the SUPL mode denotes types of positioning (e.g., immediate, periodic, deferred), namely, trigger type information. Here, the SUPL mode denotes a periodic service type positioning.

Also, the SLP confirms a privacy of the SET prior to performing the step S11. If the user requires a notification related to location (position) information, the SLP further includes a notification parameter in the MLP TLRR message.

Hence, the SLP sends the SUPL INIT message by including periodic trigger information therein. This parameter may be used to inform of information related to the periodic positioning and of the corresponding positioning being executed by the SLP (i.e., Network-trigged case). Here, the SUPL INIT message may be sent in forms of a Wireless Application Protocol (WAP) push, a Short Message Service (SMS) trigger, a Session Initiation Protocol (SIP) push, or the like, for example.

The SET having received the SUPL INIT message requests a data connection from a packet data network (i.e., 3GPP or 3GPP2) when any data connection is not currently set between the SET itself and a certain network (S13). Once setting the data connection, the SET stores the trigger information sent by the SUPL INIT message, and then sends a SUPL START message to the SLP (S14). Here, the SET sends SET capability information by including it in the SUPL START message.

The SLP sends acknowledgement (i.e., whether the positioning can be performed) with respect to the corresponding positioning request to the SUPL agent by using a MLP Trigged Location Reporting Answer (TLRA) message exchanged (S15). Thereafter, the SLP sends a SUPL RESPONSE message to the SET in response to the SUPL START message (S16). Here, the SUPL RESPONSE message may be replaced with a SUPL TRIGGER message. In this case, the step S16 is not performed.

Afterwards, when a particular event is generated (for every certain period) based upon the stored trigger information, the SLP sends the SUPL TRIGGER message to the SET to start a positioning procedure (S17). The SET then sends a SUPL position initiating message (i.e., SUPL POS INIT) to the SLP so as to start a trigger session with the SLP (S18). The SUPL POS INIT message may include at least Location Identifiers lid indicating a session ID, a base station ID, or the like, versions, SET capabilities, and the like.

Accordingly, the SLP and the SET exchange (send and receive) consecutive messages to execute an actual positioning, and then the SLP or SET calculates a position of the SET by virtue of the consecutive messages (S19). Preferably, the messages exchanged between the SLP and the SET may include a session ID, protocols to be used for the positioning (e.g., RRLP, RRC or TIA-801), etc. Here, the positioning for the SET may be performed by the SLP based upon a positioning measurement value received from the SET (i.e., SET-assisted mode), or be performed by the SET based upon assistance obtained from the SLP (i.e., SET-based mode). FIG. 1 illustrates an example that the positioning is performed in the SET-assisted mode. However, if the positioning is performed in the SET-based mode, the SET sends the calculated position value (i.e., posresult) to the SLP using a SUPL REPORT message (S20). Therefore, the SLP sends the position value, which is calculated by the SLP itself or transferred from the SET, to the SUPL agent using a TLREP message (S21).

Afterwards, in the succeeding positioning period, the SLP and the SET perform the positioning for the corresponding period by using the SUPL TRIGGER message, the SUPL POS INIT message, the SUPL POS procedure, the SUPL REPORT message, the MLP TLREP message, and thereafter send a calculated position value of the SET to the SUPL agent (S22~S26).

Then, when the series of periodic positioning procedures are all terminated (ended) (i.e., when a positioning ending time arrives), the SLP sends a SUPL END message to inform the SET of the termination of the SUPL procedure (or SUPL session) (S27). The SET then releases an IP connection with the SLP and releases all of the resources related to the positioning session.

On the other hand, in FIG. 1, the SUPL START and SUPL RESPONSE may be omitted. In this case, the MLP TLRA message may be sent following the SUPL POS INIT message.

Figure 2:
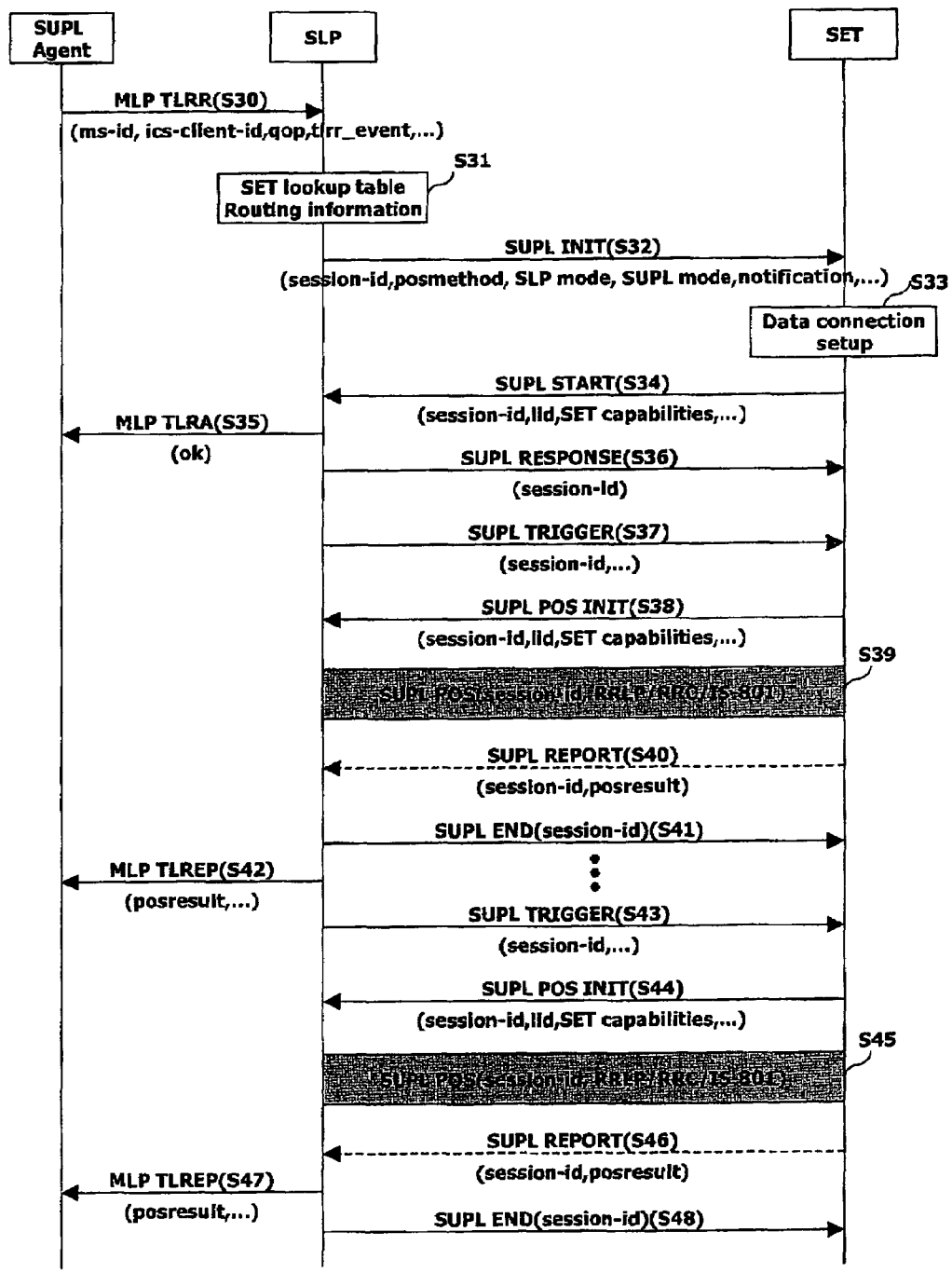
FIG. 2 is a view illustrating a periodic positioning procedure in accordance with a second embodiment of the present invention, which illustrates an example that a period for the periodic positioning is relatively longer than that in the first embodiment.

FIG. 2 is a view illustrating a periodic positioning procedure in accordance with a second embodiment of the present invention, which illustrates an example that a period for the periodic positioning is relatively longer than that in the first embodiment.

As illustrated in FIG. 2, for a long period for the periodic positioning, the SLP terminates (ends) the positioning for one period at the end of every period using a SUPL END message (here, the SUPL connection other than the SUPL session is released (disconnected)) (S41). The SLP then executes the positioning for the succeeding period at a starting point of the succeeding period by using the SUPL TRIGGER again (S43). Here, the steps (S30~S40) are the same as the steps (S10~S20) of FIG. 1 except their numerals, detailed explanation for which will not be repeated accordingly.

That is, when the periodic positioning procedure with respect to one period is terminated (ended) (S39), the SLP sends a SUPL END message to the SET to release the SUPL POS connection with respect to one period (S41). The SLP then sends a corresponding periodic positioning value to the SUPL agent using the MLP TLREP message (S42). Afterwards, the SLP connects (opens) the released SUPL POS connection using the SUPL TRIGGER message, and informs the SET of the performance of the positioning with respect to the succeeding period (S43).

Accordingly, when the corresponding event is generated, the SLP and the SET execute the positioning for the corresponding period using the SUPL POS INIT message, the SUPL POS procedure, and the SUPL REPORT and MLP TLREP messages, and then sends the corresponding position value to the SUPL agent (S44~S47). When the series of the periodic positioning procedures are all terminated (ended), the SLP sends the SUPL END message to the SET to inform of the termination of the SUPL procedure (S48).

Figure 3:
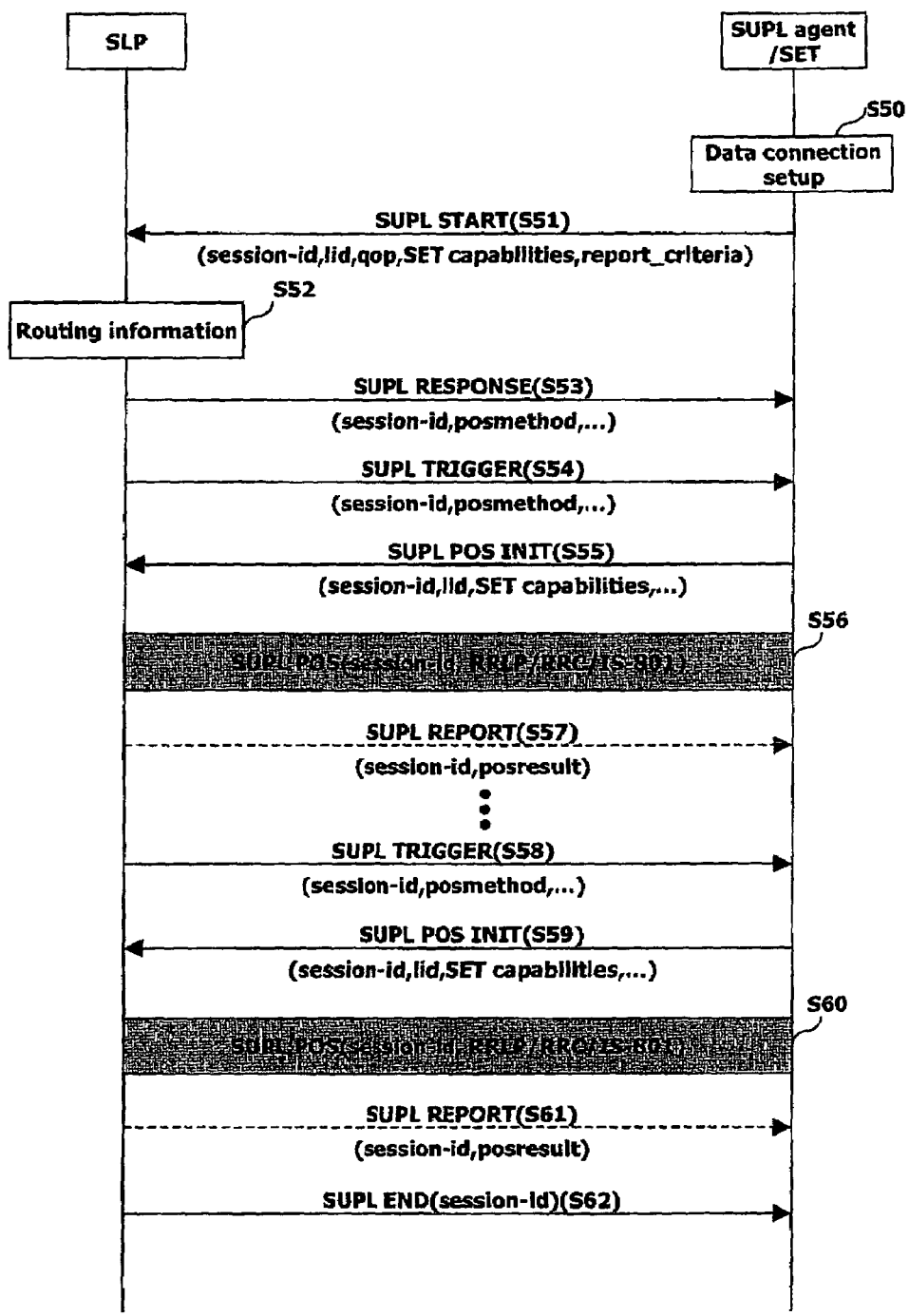
FIG. 3 is a view illustrating a periodic positioning procedure in accordance with a third embodiment of the present invention, which illustrates a positioning procedure in a Network-trigged case and a SET-initiated case.

FIG. 3 is a view illustrating a periodic positioning procedure in accordance with a third embodiment of the present invention. The third embodiment of the present invention illustrates a Network-trigged case and a SET-initiated case for a Non-Roaming Proxy mode. Here, the SLP corresponds to a home network side, while a target SET (referred to as SET hereafter) corresponds to a terminal side.

First, when a SUPL agent requests a periodic positioning, the SET requests a data connection from a packet data network (e.g., 3GPP or 3GPP2) when any data connection is not currently set between the SET itself and a certain network (S50). Once setting the data connection, the SET sends a SUPL START message to the SLP to start a periodic positioning request procedure (S51).

The SET includes a report_criteria parameter in the SUPL START message so as to set a period, a starting time and an ending time of the periodic positioning request. The SET then sends the set information to the SLP.

The SLP having received the SUPL START message stores the periodic positioning information, and checks whether the SET is currently SUPL roaming using routing information (S52). If it is checked that the SET is not SUPL roaming, the SLP sends a SUPL RESPONSE message in response to the SUPL START message (S53).

Afterwards, when the corresponding event is generated, the SLP sends a SUPL TRIGGER message to the SET to start the periodic positioning procedure (S54). The SET sends the SUPL POS INIT message to the SLP so as to start a trigger session with the SLP (S55). Here, for the initial period positioning generated, the SUPL TRIGGER message may be replaced with the SUPL RESPONSE message of the step (S53), or the SUPL RESPONSE message may be replaced with the SUPL TRIGGER message of the step (S54).

Accordingly, the SLP consecutively exchanges (sends and receives) positioning protocols (e.g., RRLP, RRC, TIA-801, etc.) with the SET using the SUPL POS message for performing the positioning, thereby calculating the position of the SET (S56). Here, the positioning for the SET can be performed by the SLP based upon a positioning measurement value received from the SET (i.e., SET-assisted mode), or be performed by the SET based upon assistance obtained from the SLP (i.e., SET-based mode).

If the positioning is performed in the SET-assisted mode, the SLP sends the calculated position value (i.e., posresult) to the SET using a SUPL REPORT message (S57). If the positioning is performed in the SET-based mode, the SLP does not send the SUPL REPORT message to the SET. Hence, the SET sends the position value calculated by the SET itself or the position value received from the SLP to the SUPL agent.

Afterwards, in the succeeding positioning period, as aforementioned, the SLP and the SET performs the positioning for the corresponding period using the SUPL TRIGGER message, the SUPL POS INIT message, the SUPL POS procedure, and the SUPL REPORT message to thereafter send the calculated position value of the SET to the SET (S58~S61).

Then, when the entire periodic positioning procedures are terminated (ended), the SLP sends the SUPL END message to the SET to inform the SET of the termination of the SUPL procedure (or the SUPL session) (S62). The SET then releases the IP connection with the SIP and releases all of the resources related to the positioning session.

Figure 4:
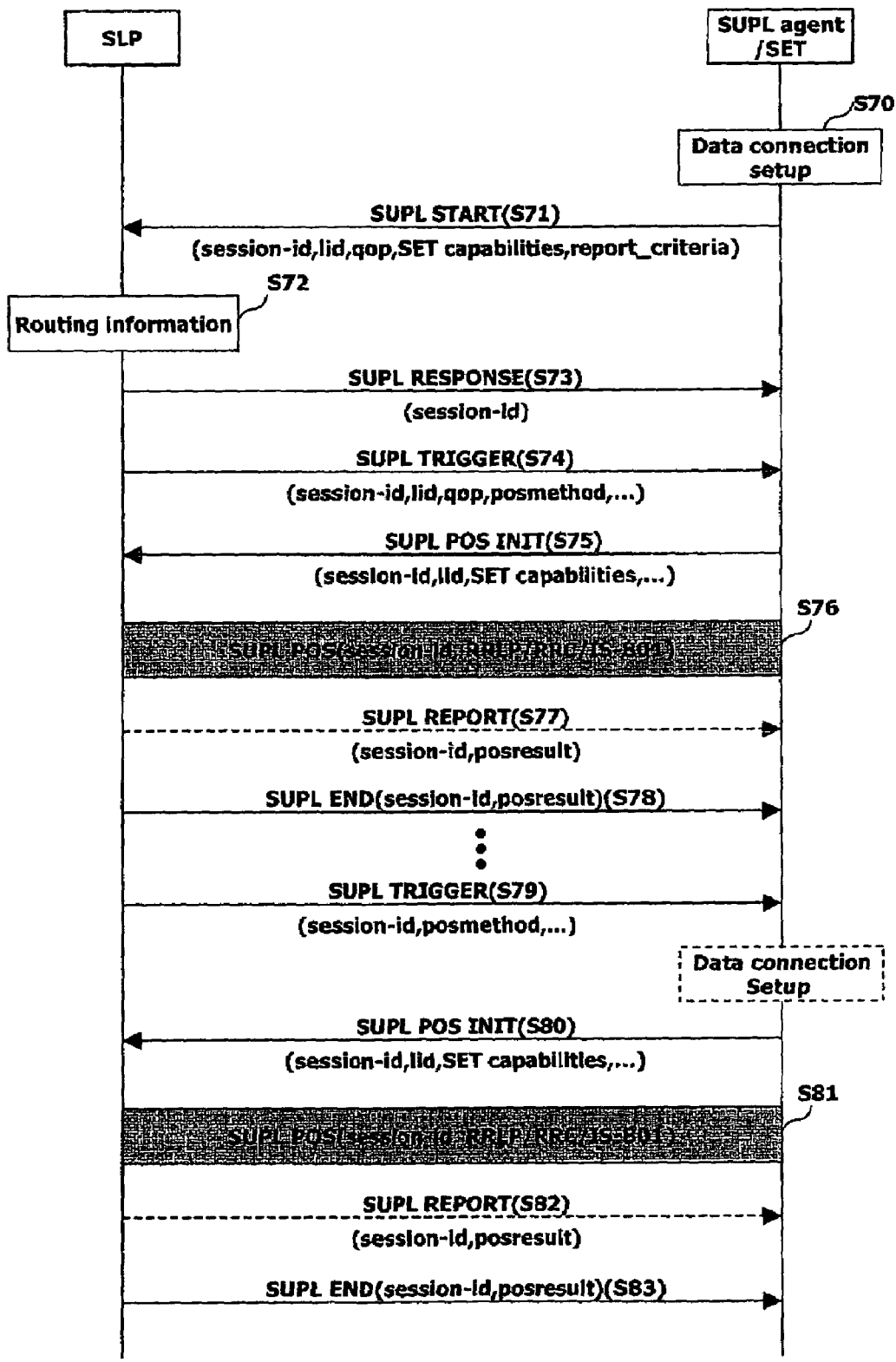
FIG. 4 is a view illustrating a periodic positioning procedure in accordance with a fourth embodiment of the present invention, which illustrates an example that a period for the periodic positioning is relatively longer than that in the third embodiment.

FIG. 4 is a view illustrating a periodic positioning procedure in accordance with a fourth embodiment of the present invention, which illustrates an example that a period for the periodic positioning is relatively longer than that in the third embodiment.

As illustrated in FIG. 4, for a long period for the period positioning, the SLP terminates (ends) the positioning with respect to one period at the end of every period using the SUPL END message (i.e., releases or disconnects the SUPL connection) (S78). The SLP then performs the positioning for the succeeding period at the starting point of the succeeding period by using the SUPL TRIGGER again (S79). Here, the steps (S70~S77) are the same as the steps (S50~S57) except their reference numerals, detailed explanation for which will not be repeated accordingly.

That is, when the periodic positioning procedure for one period is terminated (ended) (S76), the SLP sends the SUPL END message to the SET and then releases the SUPL POS connection (or trigger connection) with respect to one period (S78).

Afterwards, the SLP sends the SUPL TRIGGER message to the SET to inform the SET of the performance of the positioning with respect to the succeeding period (S79). Here, when any data connection is set between the SET itself and a certain network, the SET can request the data connection from a packet data network (e.g., 3GPP or 3GPP2).

Accordingly, when the corresponding event is generated, the SLP and the SET perform the positioning for the corresponding period using the SUPL POS INIT message, the SUPL POS procedure, and the SUPL REPORT message, and, in some cases, send the corresponding position value to the SET (S80~S82). When the series of the periodic positioning procedures are terminated (ended), the SLP sends the SUPL END message to the SET to inform the SET of the termination of the entire SUPL procedure (or the trigger session) (S83).

Figure 5:
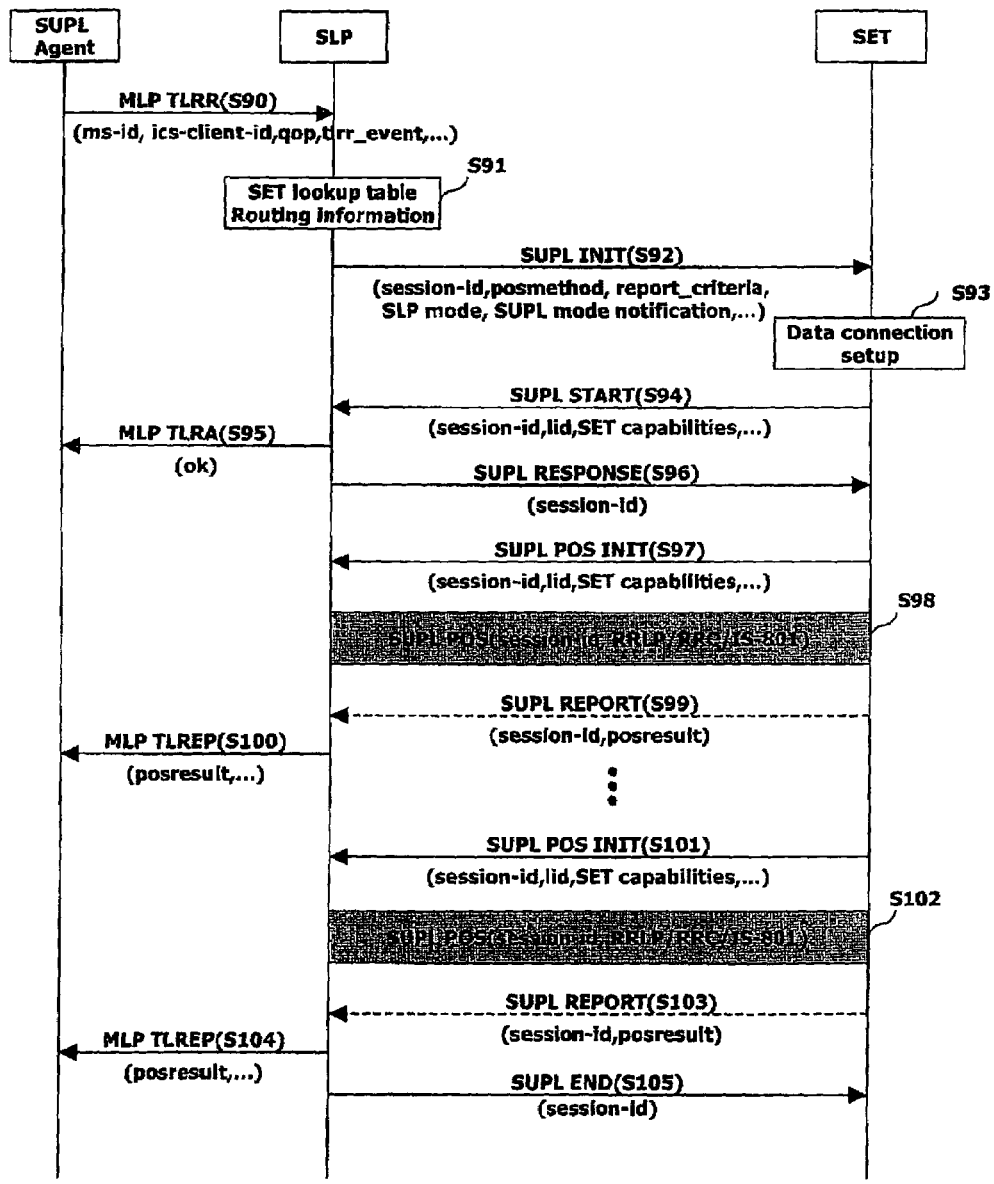
FIG. 5 is a view illustrating a periodic positioning procedure in accordance with a fifth embodiment of the present invention, which illustrates a positioning procedure in a SET-trigged case and a Network-initiated case.

FIG. 5 is a view illustrating a periodic positioning procedure in accordance with a fifth embodiment of the present invention. The fifth embodiment of the present invention illustrates a SET-trigged case and a Network-initiated case for a Non-Roaming Proxy mode. Here, the SLP corresponds to a home network side, while a target SET (referred to as SET hereafter) corresponds to a terminal side.

First, when an outer LCS client requests a periodic positioning, the SUPL agent requests the positioning from the SLP using a MLP TLRR message (S90). The MLP TLRR message, as aforementioned, may include parameters such as ms-id, client-id, QoP, tlrr_event, and the like. tlrr_event denotes a definition of the 'periodic', namely, a starting time and ending time of the periodic positioning (e.g., 8 am to 10 am) and a request period for the periodic positioning (e.g., a one-hour interval). The MLP TLRR message may further include parameters related to types of the positioning values (which, for example, represent a current value or a value obtained in the latest time when it is difficult to tracking the current value), and parameters for setting priorities with respect to each positioning request for several positioning requests.

Upon receiving the MLP TLRR message, the SLP checks whether the SET can support the SUPL using a lookup table, and checks whether the target SET is currently SUPL roaming using routing information (S91).

If it is checked that the SET supports the SUPL and not roaming, the SLP sends a SUPL INIT message to the SET to start a SUPL procedure (S92). The SUPL INIT message must at least include parameters such as session-id, posmethod, SLP mode, SUPL mode, and the like. The SUPL mode denotes trigger type information, which indicates a periodic service type in the fifth embodiment of the present invention.

The SLP checks a privacy of the SET prior to performing the step S91. If a user requires a notification related to position information, a notification parameter is additionally included in the MLP TLRR message.

The SLP includes a report_criteria parameter which is a trigger parameter (or trigger information) in the SUPL INIT message for sending. The SLP uses the report_criteria parameter to send trigger information related to the periodic positioning received from the outer LCS client to the SET. That is, the SLP forwards the trigger information which generates the periodic positioning to the SET (i.e., SET-trigged case) so as to allow a performance of an actual positioning procedure when the corresponding event is generated in the SET. For example, the report_criteria may include a period, a starting time and an ending time for requiring the periodic positioning request.

When any data connection is not set between the SET itself and a certain network, the SET having received the SUPL INIT message requests the data connection from a packet data network (e.g., 3GPP or 3GPP2) (S93).

Upon setting the data connection, the SET stores the trigger information sent through the SUPL INIT message and thereafter sends a SUPL START message to the SLP (S94). Here, the SET sends SET capability information by including it in the SUPL START message.

The SLP sends acknowledgement with respect to the corresponding positioning request to the SUPL agent by using a MLP TLRA message (S95). The SLP then sends a SUPL RESPONSE message in response to the SUPL START message to allow the SET to start the positioning procedure when the corresponding event is generated (S96).

Afterwards, when the corresponding event is generated based upon the stored trigger information (i.e., per period for the periodic positioning), the SET sends the SUPL POS INIT message to the SLP to start the positioning procedure with the SLP (S97). Here, if a TCP/IP connection set between the SLP and the SET is terminated (released) after sending the SUPL RESPONSE message, the SET must reset the data connection prior to sending the SUPL POS INIT message.

Accordingly, the SET consecutively exchanges messages for performing an actual positioning with the SLP to calculate the position of the SET (S98). Here, the positioning for the SET may be performed by the SLP based upon a positioning measurement value received from the SET (i.e., SET-assisted mode), or be performed by the SLP based upon assistance obtained from the SLP.

Upon performing the positioning in the SET-based mode, the SET sends the calculated position value (i.e., posresult) to the SLP using the SUPL REPORT message (S99). Upon performing the positioning in the SET-assisted mode, the SLP does not send the SUPL REPORT message. Accordingly, the SLP sends the corresponding positioning value to the SUPL agent using the TLREP message (S100).

In the succeeding positioning period, the SLP and the SET perform the positioning of the corresponding period by using the SUPL POS INIT message, the SUPL POS procedure, the SUPL REPORT message, and the MLP TLREP message, and thereafter send a calculated position value of the SET to the SUPL agent (S101~S104).

Afterwards, when the series of the periodic positioning procedures are terminated (ended) (i.e., at the positioning ending time), the SLP sends a SUPL END message to the SET to inform the SET of the termination of the SUPL procedure (or SUPL session). The SET then releases the IP connection with the SLP and releases all of the resources related to the positioning session.

In FIG. 5, on the other hand, the SUPL START and SUPL REPORT messages may be omitted. In this case, the MLP TLRA message may be sent after sending the SUPL POS INIT message.

Figure 6:
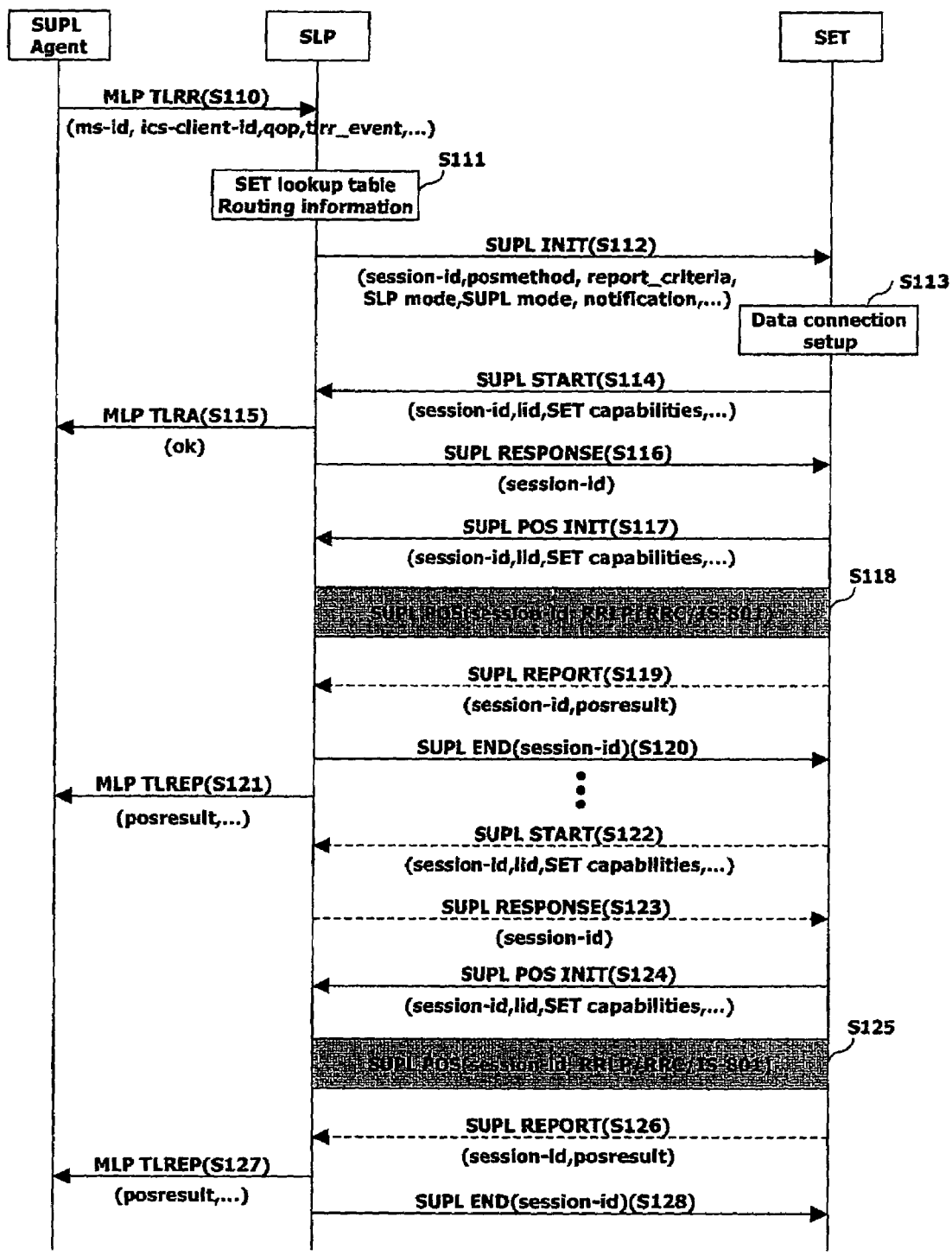
FIG. 6 a view illustrating a periodic positioning procedure in accordance with a sixth embodiment of the present invention, which illustrates an example that a period for the periodic positioning is relatively longer than that in the fifth embodiment.

FIG. 6 a view illustrating a periodic positioning procedure in accordance with a sixth embodiment of the present invention, which illustrates an example that a SET can open or connect a SUPL session for every period when a period for the periodic positioning is relatively longer than that in the fifth embodiment.

As illustrated in FIG. 6, for a long period for the periodic positioning, the SLP terminates (ends) the positioning for one period at the end of every period using a SUPL END message (here, the SUPL connection is released (disconnected)) (S120). The SET then re-sends the SUPL START message to the SLP at a starting point of the succeeding period to perform the positioning for the succeeding period (S122). Here, the steps (S110~S119) are the same as the steps (S90~S99) except their reference numerals, detailed explanation for which will not be repeated accordingly.

That is, when the periodic positioning procedure for one period is terminated (S118), the SLP sends the SUPL END message to the SET to release a SUPL POS connection for the one period (S120). The SLP thereafter sends the corresponding periodic positioning value to the SUPL agent using the MLP TLREP message (S121).

Then, in the succeeding positioning period, the SET performs the positioning for the corresponding period using the SUPL START, SUPL REPONSE, SUPL POS INIT messages, the SUPL POS procedure, and the SUPL REPORT and MLP TLREP messages, and thereafter sends the corresponding position value to the SUPL agent (S122~S127). Here, the SUPL START message may be used for informing the SLP of the starting of the positioning for the succeeding period. When the series of the periodic positioning procedures are terminated (ended), the SLP sends the SUPL END message to the SET to inform the SET of the termination of the SUPL procedure (S128).

Figure 7:
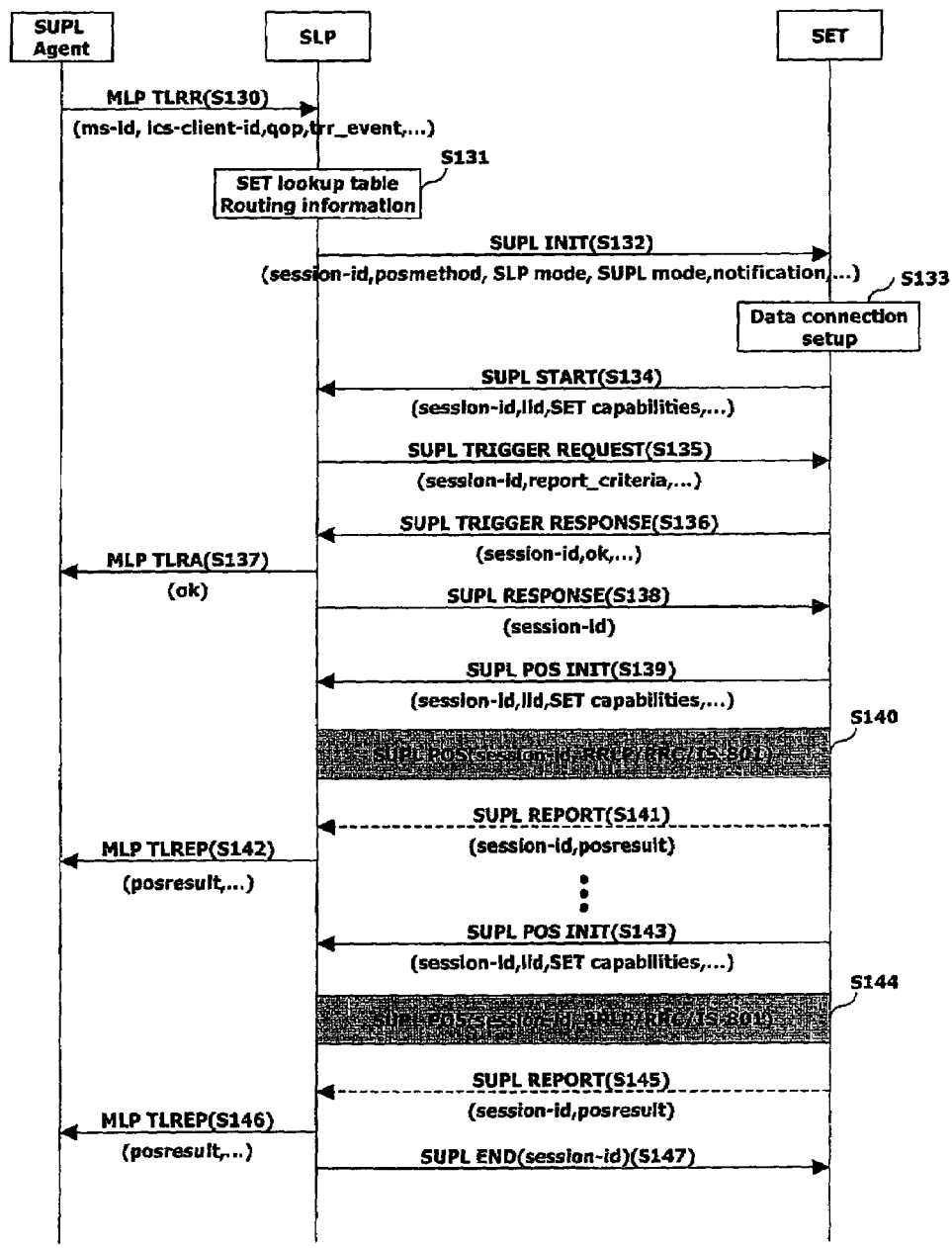
FIG. 7 is a view illustrating a periodic positioning procedure in accordance with a seventh embodiment of the present invention, which illustrates a procedure for sending trigger information to a SET using a new message.

FIG. 7 is a view illustrating a periodic positioning procedure in accordance with a seventh embodiment of the present invention. The seventh embodiment illustrates an example that the SLP sends the report_criteria using a new SUPL TRIGGER REQUEST message when the SLP can not send the report_criteria using the SUPL INIT message due to a limitation on the size of the SUPL INIT message.

That is, the seventh embodiment of the present invention is different from the fifth embodiment in view of the addition of SUPL TRIGGER REQUEST and SUPL TRIGGER RESPONSE message, and also in view of the addition of a SUPL mode (which is a parameter for identifying immediate, periodic, or deferred positioning) to the SUPL INIT message. Other steps are the same as those in the fifth embodiment except their reference numerals.

Hence, upon performing the aforementioned steps (S130~S134), the SLP sends information related to the periodic positioning to the SET using a SUPL TRIGGER REQUEST message (S135), so as to make the SET arrange the periodic positioning according to the corresponding information and to allow the SET to separately perform a user confirmation. The SET stores the periodic trigger information sent by the SUPL TRIGGER REQUEST message and thereafter sends a SUPL TRIGGER RESPONSE message in response to the SUPL TRIGGER REQUEST message (136).

However, unlike FIG. 5, as illustrated in FIG. 7, the SLP receives the SUPL TRIGGER RESPONSE message from the SET and then sends a MLP TLRA message to the SUPL agent (S137). Since the SLP sends to the SET the SUPL TRIGGER REQUEST message which includes the trigger information related to the periodic positioning, and then receives from the SET the SUPL TRIGGER RESPONSE message in response to the SUPL TRIGGER REQUEST message, only the reception of the SUPL TRIGGER RESPONSE message can inform that the trigger information related to the periodic positioning has completely sent to the SET. However, the SUPL TRIGGER RESPONSE message can be omitted. In this case, the SLP sends the SUPL TRIGGER REQUEST message and then immediately sends the MLP TLRA message to the SUPL agent.

The SUPL INIT message can be sent in a SMS sending manner. Accordingly, when the report_criteria parameter can not be all included in the SMS, the SUPL TRIGGER REQUEST message may denote a message for separately sending the report_criteria parameter, and the SUPL TRIGGER RESPONSE message corresponds to a message in response to the SUPL TRIGGER REQUEST message. Therefore, both the SUPL START message and the SUPL RESPONSE message can be omitted in FIG. 5. In FIG. 7, however, for sending the trigger information related to the periodic positioning by the SUPL TRIGGER REQUEST message and receiving the SUPL TRIGGER RESPONSE, the SET must first send the SUPL START message to the SLP to obtain an acceptance from the SLP with respect to the periodic positioning included in the SUPL INIT. Accordingly, only the SUPL RESPONSE message may be omitted.

Even in the seventh embodiment of the present invention, for the long period for the periodic positioning, a procedure can be changed so as to be able to open (connect) the SUPL session by the SET per every period. In this case, the SUPL START message and the SUPL RESPONSE message are added for every positioning period prior to sending the SUPL POS INIT message. If the SUPL REPORT message is not used (required), the SUPL END message is added following the SUPL POS procedure. If the SUPL REPORT message is used, the SUPL END message is added following the SUPL REPORT message.

Figure 8:
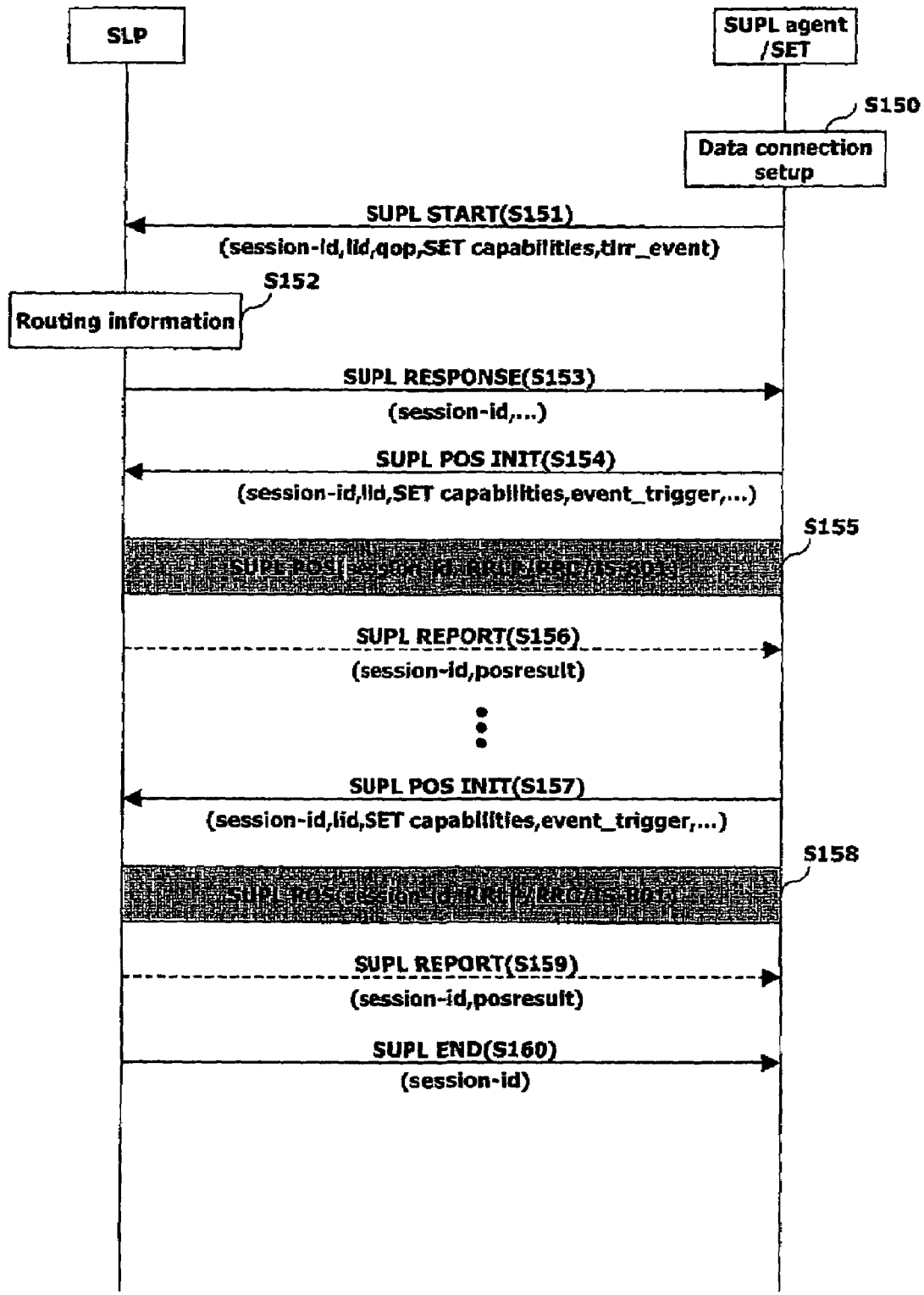
FIG. 8 is a view illustrating a periodic positioning procedure in accordance with an eighth embodiment of the present invention, which illustrates a positioning procedure in a SET-trigged case and a SET-initiated case.

FIG. 8 is a view illustrating a periodic positioning procedure in accordance with an eighth embodiment of the present invention. The eighth embodiment illustrates a SET-trigged case and a SET-initiated case for a Non-Roaming Proxy mode.

First, when a SUPL agent requests a periodic positioning, if any data connection is not set between the SET and a certain network, the SET requests the data connection from a packet data network (e.g,. 3GPP or 3GPP2) (S150).

Upon setting the data connection, the SET sends a SUPL START message to the SLP to start a periodic positioning request procedure (S151). Here, the SET includes a tlrr_event parameter in the SUPL START message to set a period, a starting time and an ending time of the periodic positioning request, thereby sending the SUPL START message to the SLP. That is, the SET is performing the periodic SUPL procedure with managing trigger information, and accordingly the SET may not send the tlrr_event parameter to the SLP. However, the sending of the tlrr_event to the SLP is to previously inform the SLP of information related to resource management and the periodic positioning.

The SLP having received the SUPL START message checks whether the SET is currently SUPL roaming using routing information (S152). If the SET is not roaming, the SLP sends a SUPL RESPONSE message in response to the SUPL START message (S153).

Afterwards, when a certain event is generated based upon pre-stored trigger information (at the positioning period), the SET sends a SUPL POS INIT message to the SLP to start the periodic positioning procedure (S154). Here, the SET can inform the SLP using an event_trigger parameter that the periodic positioning period has currently arrived and also can inform the SLP of the remaining period of the entire positioning period using the event_trigger parameter. Here, if a TCP/IP connection between the SLP and the SET is terminated after sending the SUPL RESPONSE message, the SET must reset the data connection prior to sending the SUPL POS INIT message.

Therefore, the SET consecutively exchanges messages for performing an actual positioning with the SLP to calculate the position of the SET (S155). Here, the positioning for the SET may be performed by the SLP based upon a positioning measurement value received from the SET (i.e., SET-assisted mode), or be performed by the SET based upon assistance obtained from the SLP (i.e., SET-based mode).

FIG. 8 illustrates the positioning performed in the SET-based mode.

However, if the positioning is performed in the SET-assisted mode, the SLP sends the calculated position value (i.e., posresult) to the SET using the SUPL REPORT message (S156). Accordingly, the SET sends the position value calculated by the SET itself or the position value received from the SLP to the SUPL agent.

Afterwards, in the succeeding positioning period, the SLP and the SET, as described above, perform the positioning for the corresponding period using the 15 SUPL POS INIT message, the SUPL POS procedure, and the SUPL REPORT message to thusly calculate the position value of the SET (S157~S159). Then, when the series of periodic positioning procedures are all terminated (ended), the SLP sends the SUPL END message to the SET to inform the SET of the termination of the SUPL procedure (S160). The SET then releases the IP connection with the SLP and also releases all of the resources related to the positioning procedure.

Figure 9:
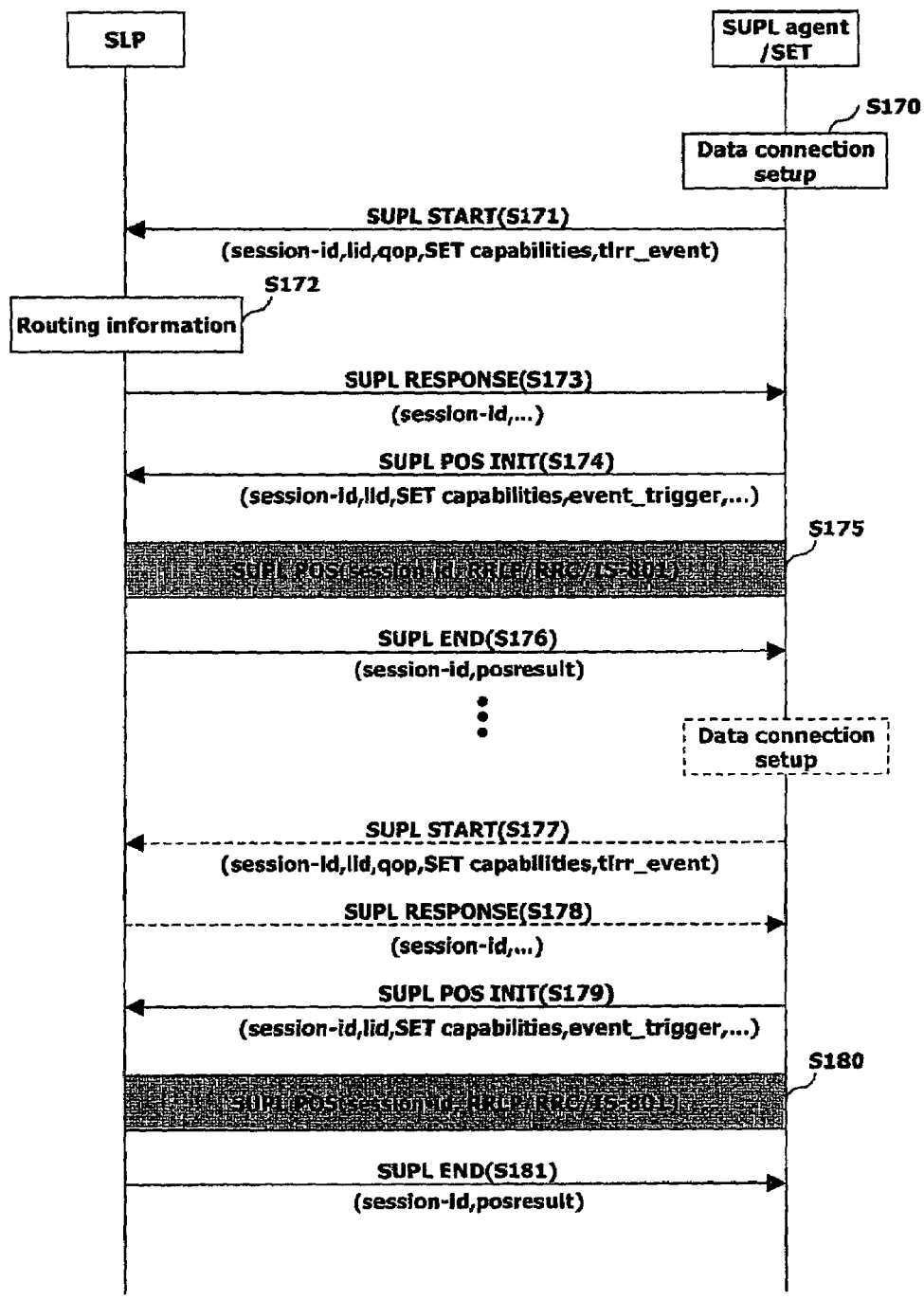
FIG. 9 is a view illustrating a periodic positioning procedure in accordance with a ninth embodiment of the present invention, which illustrates an example that a period for the periodic positioning is relatively longer than that in the eighth embodiment.

FIG. 9 is a view illustrating a periodic positioning procedure in accordance with a ninth embodiment of the present invention, which illustrates an example that a period for the periodic positioning is relatively longer than that in the eighth embodiment.

As illustrated in FIG. 9, for a long period for the periodic positioning, the SLP terminates (ends) the positioning for one period at the end of every period using the SUPL END message (i.e., releases or disconnects the SUPL connection) (S176). The SET re-sends the SUPL START message to the SLP at the starting point of the succeeding period to perform the positioning for the succeeding period (S177). Here, the steps (S170~S175) are the same as the steps (S150~S155) except their reference numerals, detailed explanation for which will not be repeated accordingly.

That is, when the periodic positioning procedure for one period is terminated (ended) (S175), the SLP sends the SUPL END message to the SET and terminates (ends) the SUPL POS session for the one period (S176).

Afterwards, in the succeeding positioning period, the SET re-performs the positioning for the corresponding period using the SUPL START, SUPL RESPONSE, SUPL POS INIT, and SUPL POS procedure messages (S177~S180). In this case, the tlrr_event of the SUPL START message includes a decreased period value. If any data connection is not set between the SET itself and a certain network, the SET requests the data connection from a packet data network (e.g., 3GPP or 3GPP2) prior to sending the SUPL START message.

Accordingly, when the series of periodic positioning procedure is terminated, the SLP sends the SUPL END message to the SET to inform the SET of the termination of the SUPL procedure (S181).

As described above, in the present invention, the periodic positioning method in the SUPL based position information system can be provided so as to enable a provisioning of various positioning methods to a user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of performing periodic positioning in a mobile communication network, the method performed by a SLP (SUPL Location Platform) and comprising:
   receiving, from a Secure User Plane Location (SUPL) agent, a request message for periodic positioning of a target terminal (SET);
   sending, to the target terminal, a first Secure User Plane Location (SUPL) message that includes trigger type information related to the periodic positioning;
   receiving, from the target terminal, a Secure User Plane Location (SUPL) START message to start a periodic triggered session with the SLP for the periodic positioning, the SUPL START message including at least a session-id and target terminal capabilities, wherein the target terminal capabilities are used to select an intended positioning method to be used for the periodic triggered session;
   sending, to the target terminal, a second Secure User Plane Location (SUPL) message that includes information related to a start time of the periodic triggered session and an interval for the periodic positioning;
   receiving, from the target terminal, a Secure User Plane Location (SUPL) POS INIT message to start the periodic positioning;
   exchanging, with the target terminal, positioning procedure messages for the periodic positioning;
   calculating a position of the target terminal based upon the exchanged positioning procedure messages; and
   reporting, to the SUPL agent, the calculated position of the target terminal,
   wherein all of the above steps are based on Secure User Plane Location (SUPL) technology that provides periodic positioning through a user plane, and
   wherein the SLP and the target terminal support Internet Protocol (IP).

2. The method of claim 1, further comprising:
   sending, to the target terminal, a SUPL END message after the periodic positioning is completed.

3. The method of claim 1, wherein the first SUPL message is a SUPL INIT message.

4. The method of claim 3, wherein the SUPL INIT message is sent via at least one of WAP (Wireless Application Protocol) push, SMS (Short Messaging Service), and SIP (Session Initiated Protocol).

5. The method of claim 1, wherein the steps of:
   receiving, from the target terminal, a SUPL POS INIT message to start the periodic positioning; exchanging, with the target terminal, positioning procedure messages for the periodic positioning; calculating a position of the target terminal based upon the exchanged positioning procedure messages; and reporting, to the SUPL agent, the calculated position of the target terminal,
   are repeated based on the second SUPL message.

6. A method of performing periodic positioning in a mobile communication system, the method performed by an SLP (SUPL Location Platform) and comprising:
   receiving, from a target terminal, a Secure User Plane Location (SUPL) START message to start a periodic positioning session, the SUPL START message including information related to a period and a start time of the periodic positioning session;
   sending, to the target terminal, a Secure User Plane Location (SUPL) RESPONSE message that includes a session-id;
   receiving, from the target terminal, a Secure User Plane Location (SUPL) POS INIT message to start the periodic positioning according to the information included in the received SUPL START message;
   exchanging, with the target terminal, positioning procedure messages for the periodic positioning;
   calculating a position of the target terminal based upon the exchanged positioning procedure messages; and
   reporting, to the target terminal, the calculated position of the target terminal,
   wherein all of the above steps are based on Secure User Plane Location (SUPL) technology that provides periodic positioning through a user plane, and
   wherein the SLP and the target terminal support Internet Protocol (IP).

7. The method of claim 6, further comprising:
   receiving, from the target terminal, a Secure User Plane Location (SUPL) END message after the periodic positioning is completed.

* * * * *